United States Patent [19]
Connolly et al.

[11] 3,932,707
[45] Jan. 13, 1976

[54] ELECTRIC IMPULSE TRANSMITTERS FOR TELEPHONE INSTRUMENTS

[76] Inventors: David Charles Anthony Connolly, 26 Eden Grove, Middridge, Shildon, Durham; Per Jorgen Hovland, 254 Scholar's Park, Newton Aycliffe, Durham, both of England

[22] Filed: Oct. 25, 1974

[21] Appl. No.: 517,952

[30] Foreign Application Priority Data
Oct. 25, 1973 United Kingdom............... 49698/73

[52] U.S. Cl.......... 179/16 AA; 179/84 A; 179/90 K
[51] Int. Cl.²......................................... H04M 1/50
[58] Field of Search............ 179/16 R, 16 A, 16 AA, 179/84 R, 84 A, 81 R, 99, 90 B, 90 K, 90 R

[56] References Cited
UNITED STATES PATENTS

| | | | |
|---|---|---|---|
| 3,601,552 | 8/1971 | Ware et al......................... | 179/90 B |
| 3,609,249 | 9/1971 | Anede................................ | 179/99 |
| 3,686,444 | 8/1972 | Stevenson......................... | 179/81 R |
| 3,686,445 | 8/1972 | Barnaby et al.................... | 179/84 R |

FOREIGN PATENTS OR APPLICATIONS

| | | | |
|---|---|---|---|
| 832,415 | 4/1960 | United Kingdom............ | 179/16 AA |
| 1,236,961 | 6/1971 | United Kingdom............ | 179/16 AA |

Primary Examiner—Kathleen H. Claffy
Assistant Examiner—Randall P. Myers
Attorney, Agent, or Firm—Kirschstein, Kirschstein, Ottinger & Frank

[57] ABSTRACT

An electric circuit in an electric impulse transmitter which is responsive to the cessation of line current, except during loop-break impulses, to provide a clearing signal for storage circuits of said impulse transmitter.

7 Claims, 1 Drawing Figure

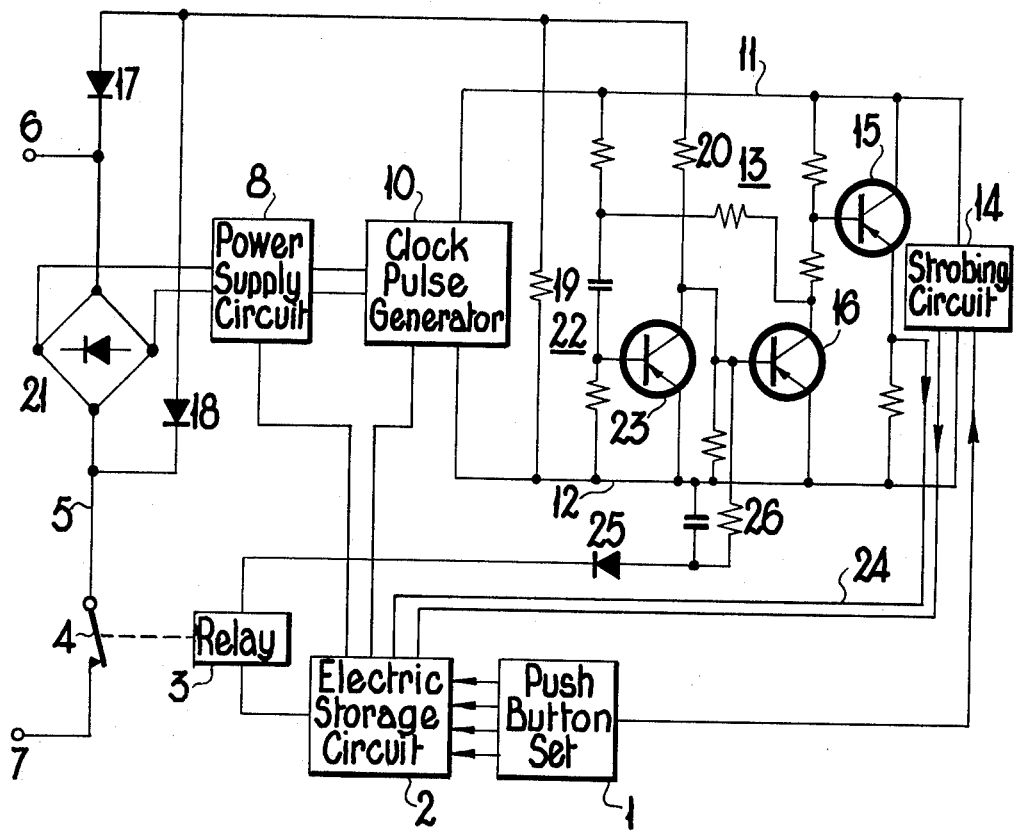

ELECTRIC IMPULSE TRANSMITTERS FOR TELEPHONE INSTRUMENTS

The present invention relates to electric impulse transmitters for telephone instruments.

In particular the invention is concerned with electric impulse transmitters including electric storage circuits in which decimal or other digit values are stored while awaiting signalling to associated exchange equipment. Such an impulse transmitter is described in U.S. Pat. No. 3,601,552.

According to one aspect of the present invention in an electric impulse transmitter for a telephone instrument, which impulse transmitter is arranged to signal over a looped line to associated exchange equipment the digit values of a telephone number to be called, which digit values are arranged to be stored temporarily in electric storage circuits in said impulse transmitter, by means of trains of impulses comprising alternate loop make and loop break periods, there is provided electric circuit means responsive to the cessation of current in said line, except during loop break periods of said trains of impulses, to provide a clear signal for said electric storage circuits.

According to another aspect of the present invention in an electric impulse transmitter for a push-button telephone instrument including electric storage means for storing digit values selected by operation of respective push-buttons of the instrument and electric impulse generator means for generating trains of impulses representative of the digit values stored in said storage means, there are provided electric circuit means responsive to the cessation of line current to the instrument, except during loop-break periods of said trains of impulses, to provide a clear signal for said electric storage means.

Preferably said electric circuit means is prevented from providing said clear signal during said loop-break periods by a signal from the output of said impulse generator means.

An electric impulse transmitter for a telephone instrument in accordance with the present invention will now be described with reference to the accompanying drawing, which shows parts of the impulse transmitter schematically.

Referring to the drawing the impulse transmitter comprises a set of 10 push buttons, represented by the block 1, one pushbutton for each decimal digit value, by means of which electric signals representing the digit values of a telephone number to be called are entered in an electric storage circuit 2. Output circuits of the storage circuit 2 are arranged to apply trains of impulses in respect of these digit values, typically at a rate of 10 impulses per second, to an electromagnetic relay 3 whose contacts 4 are arranged to be connected in a conductive path 5 in the telephone instrument (not shown) between line terminals 6 and 7. By this means the digit values entered in the storage circuit 2 are signalled to the associated exchange equipment (not shown) as trains of alternate line-loop-make and -break periods, as in conventional dialling.

The electric storage circuit 2 and other electric circuits of the impulse transmitter are energised when required by way of a power supply circuit 8, which may include a secondary battery which is recharged from an exchange source during the course of telephone conversations, as described in U.S. Pat. No. 3,601,552, or when the instrument is idle. Alternatively, as will be assumed in the following description, the power supply circuit may comprise a large-value capacitor (not shown) which is arranged to be charged from an exchange source while the impulse transmitter is in use, during the line loop-make periods.

The storage circuit 2, which utilises metal oxide semiconductor (MOS) four-phase logic circuits, is arranged to provide an "off-normal" signal on a path 9 when one or more decimal digit values have been selected and entered in the storage circuit 2 by means of the pushbuttons but not yet signalled to the exchange equipment. This off-normal signal is arranged to apply energising current from the circuit 8 to a clockpulse generator 10 which provides two interlaced trains of clockpulses for energising and timing the operation of the storage circuit 2. These pulse trains may each have a repetition rate of twenty thousand pulses per second and an amplitude of nineteen volts.

The clockpulse generator 10 also provides a steady voltage of nineteen volts between lines 11 and 12 for energising a clear and reset circuit 13 and a strobing circuit 14 provides a brief pulse upon operation of any one of the ten pushbuttons, this pulse being utilised to enter the corresponding digit value in the storage circuit 2, as described in U.S. Pat. No. 3,601,552.

The clear and reset circuit 13 comprises an n-p-n junction transistor 15 which is arranged to be biased on or off in dependence upon current flow through a buffer amplifier comprising a p-n-p transistor 16, such that when the transistor 16 is conducting the transistor 15 is also conducting. By way of diodes 17 and 18 and a return path through the power supply circuit 8 and the clockpulse generator 10, a voltage is set up across a resistor 19 whenever the impulse generator is in use such as to forward bias the base-emitter junction of the transistor 16 by way of a resistor 20.

When the telephone line is looped at the start of a call and any one of the set of ten pushbuttons 1 is pressed to select the associated decimal value as the first digit of a telephone number to be called, the capacitor (not shown) in the power supply circuit 8 commences to charge from the line by way of the diode bridge 21, and the voltage which appears across the resistor 19 causes the clockpulse generator 10 to be brought into operation for a few milliseconds. The resulting steady voltage generated between the lines 11 and 12, applied across a resistor-capacitor bias network 22 causes a further transistor 23 to be biased into conduction, so that in response to the initial flow of line current to the instrument the transistor 16 and 15 are held non-conducting for a few milliseconds to apply the potential of the line 12 as a clear and reset signal over the path 24 to prepare the storage circuit 2 for reception of the first digit value. When the transistor 23 subsequently becomes nonconducting and the transistors 16 and 15 are biased into conduction, the clear and reset signal ceases and the first digit value is entered in the storage circuit 2. As long as this digit value or any subsequent digit value, or any remainder, is held in the storage circuit 2 the "off normal" signal generated by the storage circuit 2 and applied to the power supply circuit 8 over the path 9 will take over and hold the clockpulse generator 10 in operation.

The size of the power storage capacitor (not shown) in the power supply circuit 8 is chosen to hold sufficient charge to maintain operation of the clockpulse generator 10, and hence the storage circuit 2, during intervals when the impulsing contacts 4 break the line loop during signalling of the stored digit values to the exchange. During these loop-break intervals the voltage across the resistor 19 falls to zero, and in order to maintain the transistors 16 and 15 in conduction and avoid the generation of a clear and reset signal, an alternative forward bias for the base emitter junction of the transistor 16 during the loop-break intervals is obtained from the drive circuit for the relay 3, whose contacts 4 break the loop, by way of a diode 25 and a resistor 26. The bias paths to the base electrode of the transistor 16 by way of the resistors 20 and 26 act as an "OR" gating arrangement.

If the loop is interrupted in any way other than by operation of the contacts 4 while digit values remain in the storage circuit 2, for example by operation of gravity switch contacts of the telephone instrument when the handset thereof (not shown) is replaced, the voltage across the resistor 19 falls to zero and the transistors 16 and 15 become nonconducting. The storage circuit 2 is thereupon cleared before the clockpulse generator 10 ceases operation, so that any digit values held in the circuit 2 cannot survive a brief loop interruption.

We claim:

1. An electric impulse transmitter for a telephone instrument including electric storage means for storing digit values in respect of a telephone number to be called and electric impulse generator means for generating trains of impulses representative of the digit values stored in said storage means, wherein there are provided electric circuit means responsive to the cessation of line current to the instrument, except during loop-break periods of said trains of impulses, to provide a clear signal for said electric storage means.

2. An electric impulse transmitter in accordance with claim 1 wherein said electric circuit means is prevented from providing said clear signal during said loop break periods by a signal from the output of said impulse generator means.

3. An electric impulse transmitter for a push-button telephone instrument comprising electric storage means, means for entering digit values in said storage means as selected by operation of respective push-buttons of the instrument, electric impulse generator means for generating trains of impulses representative of digit values stored in said storage means, first electric circuit means responsive to line current flowing to the instrument, and further electric circuit means responsive to said trains of impulses and to an output from said first circuit means to provide a clearing signal for said storage means upon cessation of line current to the instrument other than due to signalling of said impulses.

4. An electric impulse transmitter in accordance with claim 3 wherein said first circuit means comprises rectifier means to derive a unidirectional voltage in response to the flow of line current to the instrument.

5. An electric impulse transmitter in accordance with claim 4 wherein said further circuit means comprises OR gating means to respective inputs of which said unidirectional voltage and a voltage representing said trains of impulses are applied.

6. An electric impulse transmitter in accordance with claim 5 wherein said gating means includes a transistor buffer amplifier.

7. An electric impulse transistor in accordance with claim 3 wherein there is provided means responsive to the initial flow of line current to the instrument to provide a clearing signal for said storage means.

* * * * *